(12) United States Patent
Cheng et al.

(10) Patent No.: US 8,526,149 B2
(45) Date of Patent: Sep. 3, 2013

(54) LIMITING CURRENT CIRCUIT THAT HAS OUTPUT SHORT CIRCUIT PROTECTION

(75) Inventors: Ching-Chi Cheng, Taipei (TW);
Wen-Hsiang Chien, Taipei (TW)

(73) Assignee: Advanced-Connectek Inc., Taipei (TW)

( * ) Notice: Subject to any disclaimer, the term of this patent is extended or adjusted under 35 U.S.C. 154(b) by 309 days.

(21) Appl. No.: 13/086,904

(22) Filed: Apr. 14, 2011

(65) Prior Publication Data
US 2012/0176713 A1    Jul. 12, 2012

(30) Foreign Application Priority Data
Jan. 7, 2011   (TW) .............................. 100100626 A

(51) Int. Cl.
*H02H 9/00*   (2006.01)

(52) U.S. Cl.
USPC .......................................................... 361/58

(58) Field of Classification Search
USPC .......................................................... 361/58
See application file for complete search history.

(56) References Cited

U.S. PATENT DOCUMENTS

| 4,533,970 | A | * | 8/1985 | Brown | 361/58 |
|---|---|---|---|---|---|
| 4,831,484 | A | | 5/1989 | Bruch | |
| 4,894,567 | A | * | 1/1990 | Lenk | 327/321 |
| 5,724,218 | A | | 3/1998 | Tihanyi | |
| 5,761,019 | A | * | 6/1998 | Kroll | 361/58 |
| 6,181,541 | B1 | * | 1/2001 | Souri et al. | 361/106 |
| 6,970,337 | B2 | * | 11/2005 | Strahm | 361/58 |
| 7,206,178 | B2 | * | 4/2007 | Friedrichs et al. | 361/93.1 |
| 7,324,315 | B2 | * | 1/2008 | Harris | 361/58 |

FOREIGN PATENT DOCUMENTS

| DE | 145352 A | 12/1980 |
|---|---|---|
| JP | 53-152145 | 4/1978 |
| JP | 11-27845 A | 1/1999 |
| JP | 2000-224753 | 11/2000 |

* cited by examiner

*Primary Examiner* — Ronald W Leja
(74) *Attorney, Agent, or Firm* — Rabin & Berdo, P.C.

(57) ABSTRACT

A limiting current circuit that has output short circuit protection is connected to an external voltage source and comprises an output terminal, an input current unit, a driving transistor, a voltage control resistor, a voltage control transistor and a delay unit. The output terminal is connected to a load and has an output current. The driving transistor has an internal resistance, a drain current and a gate voltage. The voltage control resistor has a resistor voltage. The voltage control transistor has an internal resistance and a parasitic capacitance. The delay unit makes the resistor voltage charging the parasitic capacitance to extend the period of lower internal resistance of the voltage control transistor and the period of higher internal resistance of the driving transistor, makes the internal resistance of the voltage control transistor is less than the internal resistance of the driving transistor when the load is shorted.

10 Claims, 10 Drawing Sheets

LIMITING CURRENT CIRCUIT THAT HAS OUTPUT SHORT CIRCUIT PROTECTION

FIELD OF THE INVENTION

The present invention is a limiting current circuit that has output short circuit protection.

BACKGROUND OF THE INVENTION

A short circuit is an abnormal low-resistance connection between two nodes of an electrical circuit that are meant to be at different voltages and potentially cause the electrical circuit to incurring damage, overheating, fire or explosion.

To prevent an electrical circuit from incurring damage, overheating, fire or explosion, U.S. Pat. No. 5,724,218 discloses a circuit configuration connected to a current source and a load, has a predefined current level and comprises a depletion MOSFET, an enhancement MOSFET, a resistor, a variable thermal resistor and a current sensor. The load has a load current. The enhancement MOSFET comprises a gate.

When a predefined current level for the load current is exceeded, the gate of the enhancement MOSFET discharges with a defined current that is predefined by the current source to limit the load current.

However, the discharge is too slow to protect the enhancement MOSFET from the load current that rises rapidly when a short circuit occurs that results in the enhancement MOSFET being subjected to a high current for an excessively long time period.

Accordingly, a new circuit is needed to protect a circuit from an output short circuit.

SUMMARY OF THE INVENTION

The primary objective of the present invention is to protect a circuit from an output short circuit, and the present invention comprises a limiting current circuit that has output short circuit protection.

The limiting current circuit that has output short circuit protection in accordance with the present invention is connected to an external voltage source and comprises an output terminal, an input current unit, a driving transistor, a voltage control resistor, a voltage control transistor and a delay unit.

The output terminal is connected to a load and has an output current. The driving transistor has an internal resistance, a drain current and a gate voltage. The voltage control resistor has a resistor voltage. The voltage control transistor has an internal resistance and a parasitic capacitance. The delay unit makes the resistor voltage charging the parasitic capacitance to extend the period of lower internal resistance of the voltage control transistor and the period of higher internal resistance of the driving transistor, makes the internal resistance of the voltage control transistor is less than the internal resistance of the driving transistor when the load is shorted.

DETAILED DESCRIPTION OF THE PRESENT INVENTION

Figure 1:
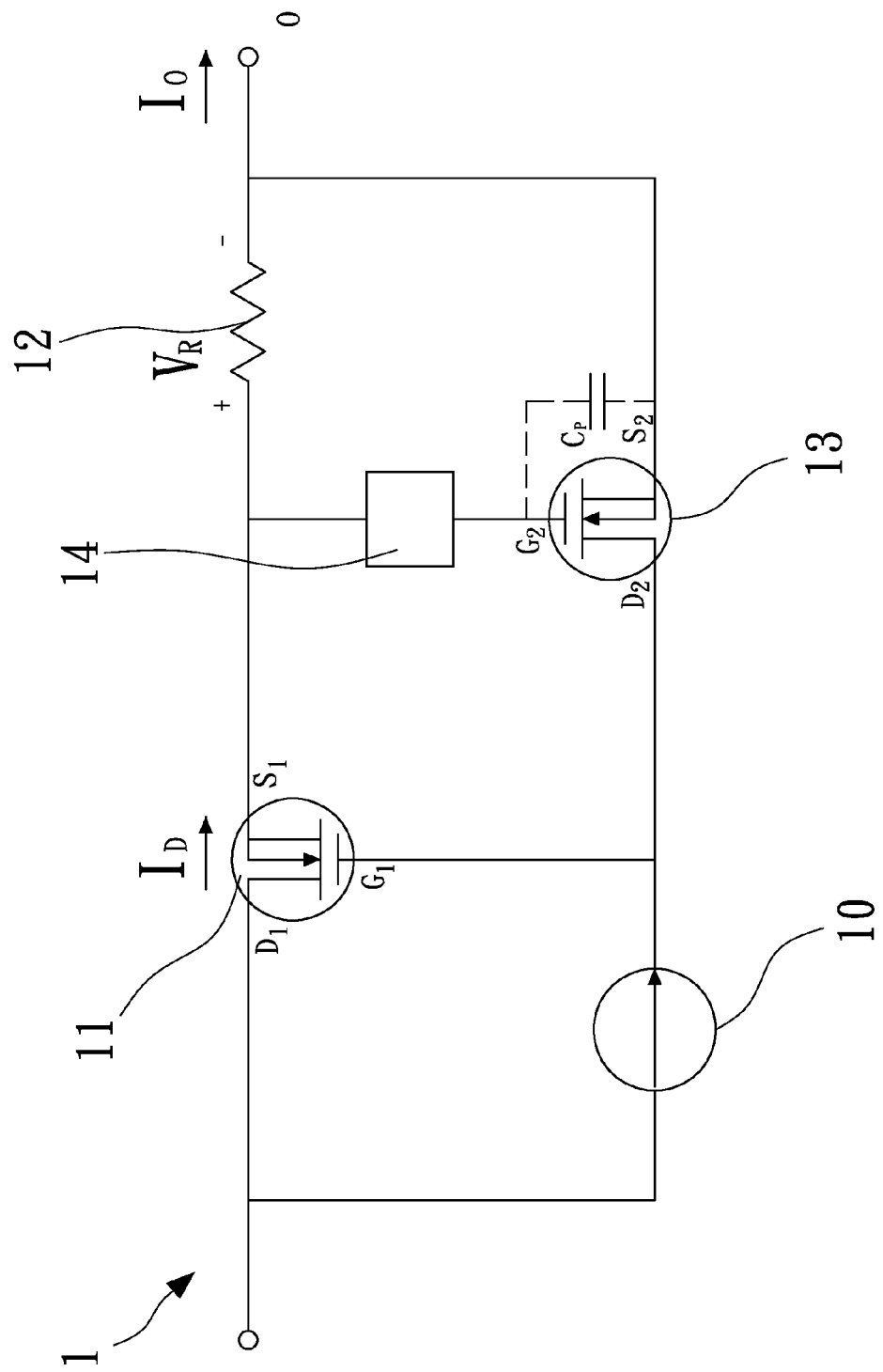
FIG. 1 is a circuit diagram of a limiting current circuit that has output short circuit protection in accordance with the present invention.
Figure 2:
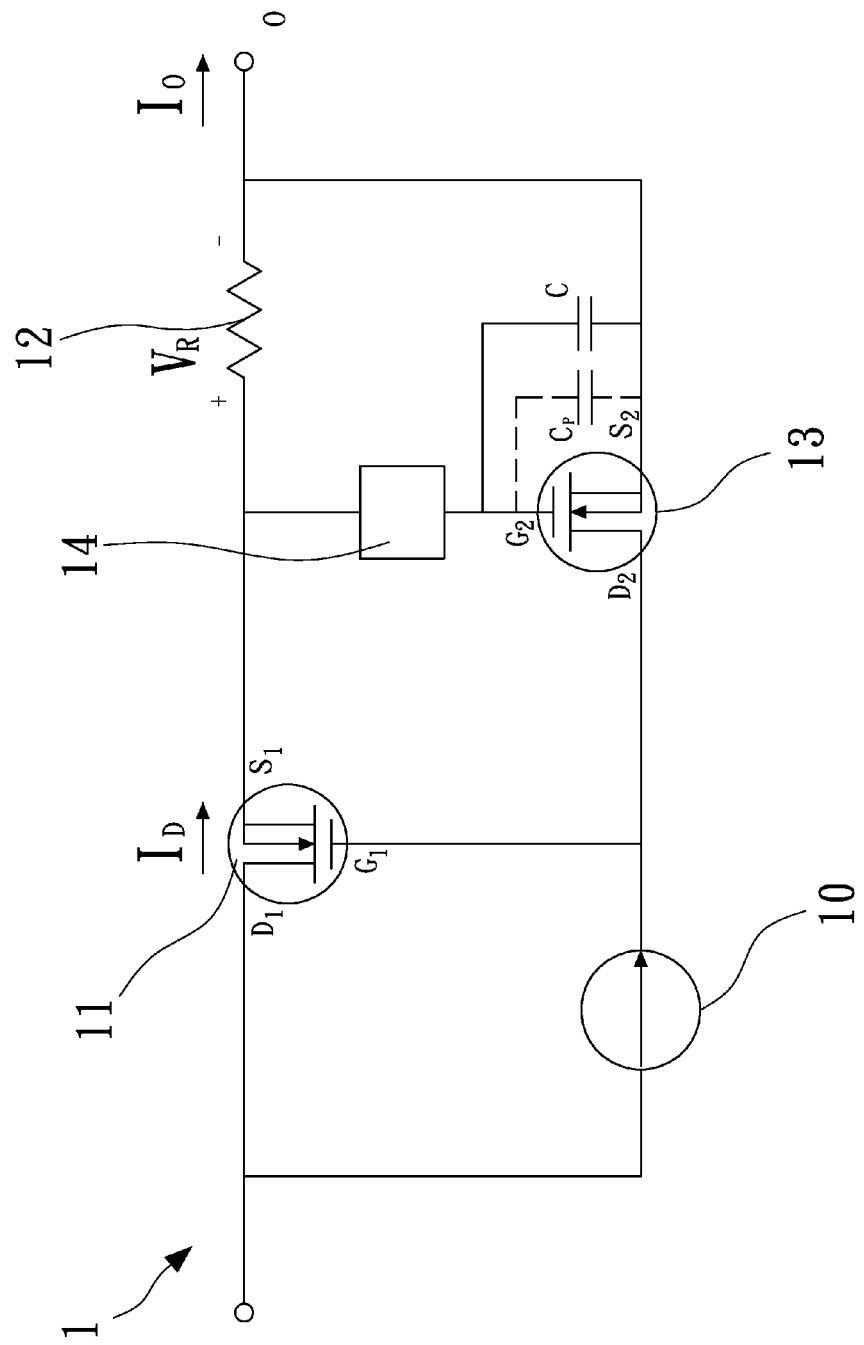
FIG. 2 is a circuit diagram of a limiting current circuit that has output short circuit protection further comprising a capacitor in accordance with the present invention.
Figure 3:
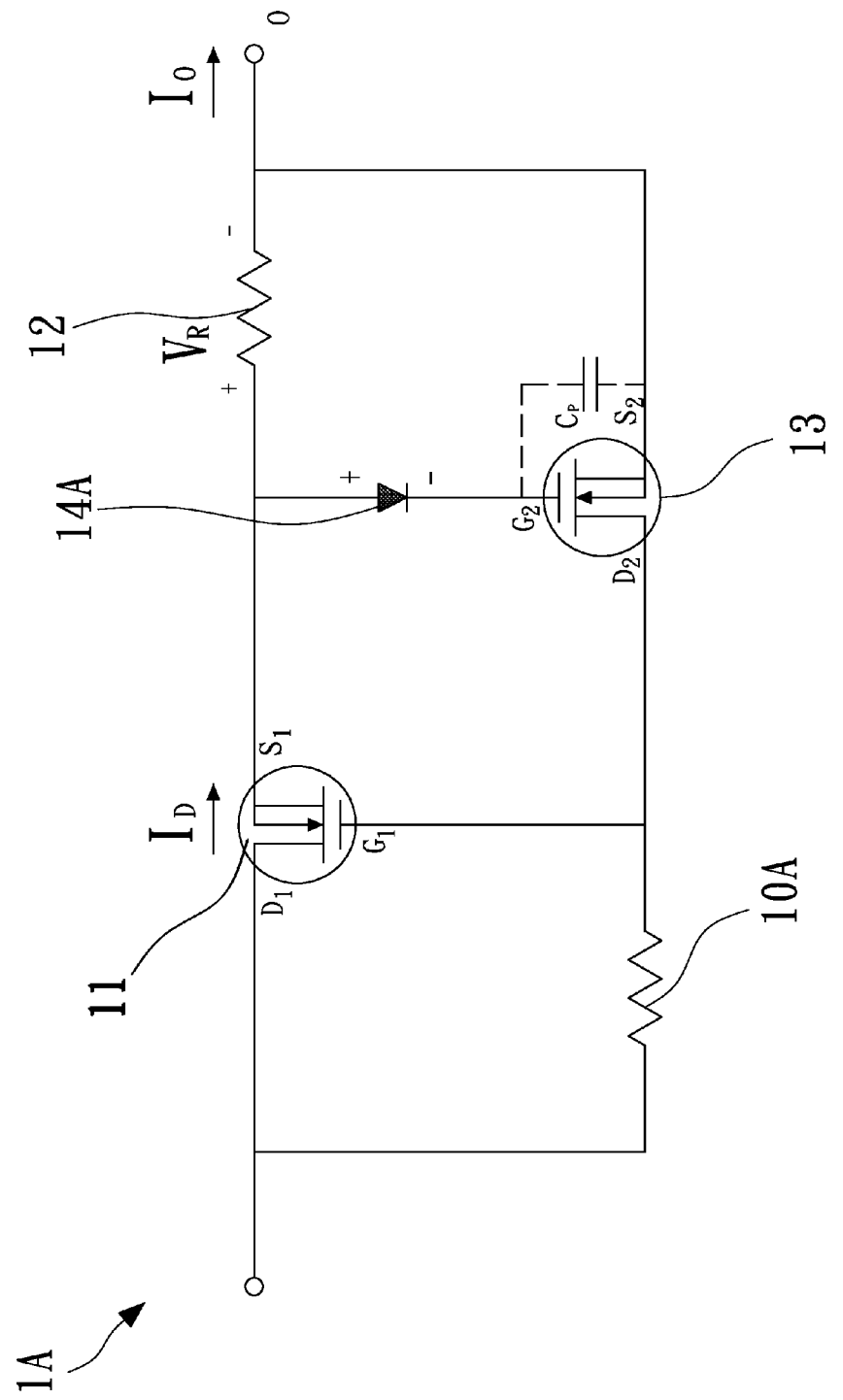
FIG. 3 is a circuit diagram of a first embodiment of the limiting current circuit in FIG. 1.
Figure 4:
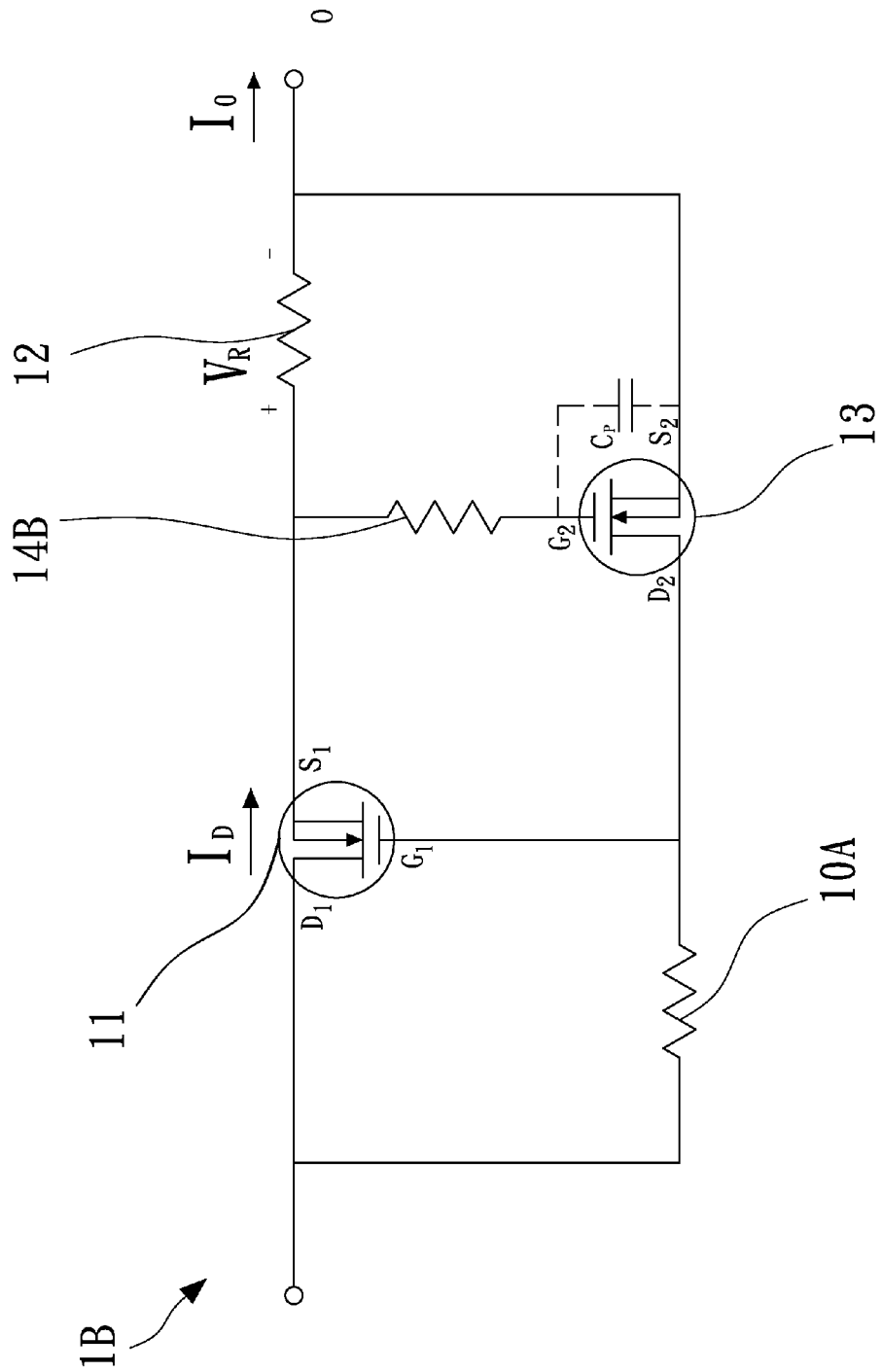
FIG. 4 is a circuit diagram of a second embodiment of the limiting current circuit in FIG. 1.
Figure 5:
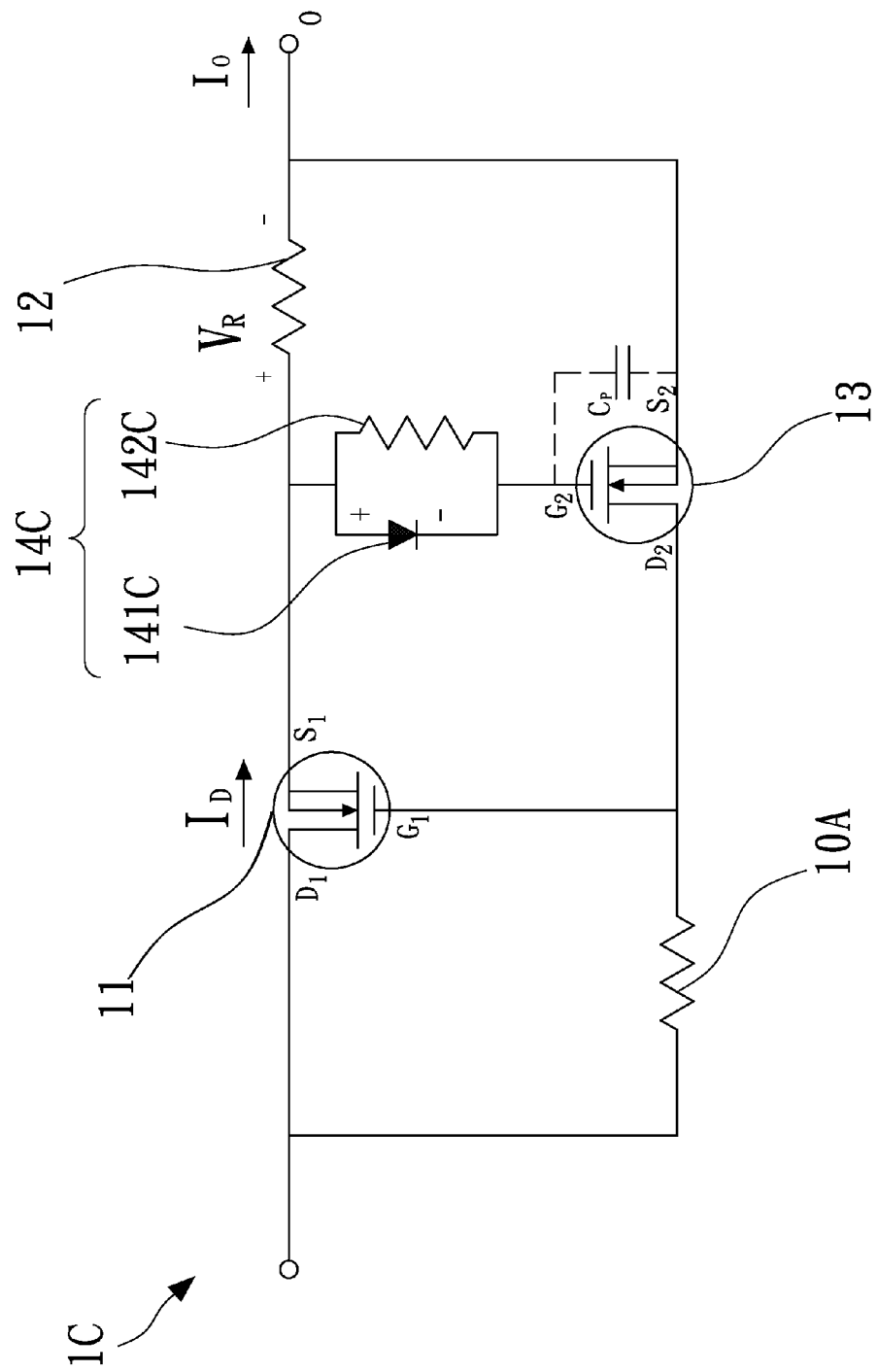
FIG. 5 is a circuit diagram of a third embodiment of the limiting current circuit in FIG. 1.
Figure 6:
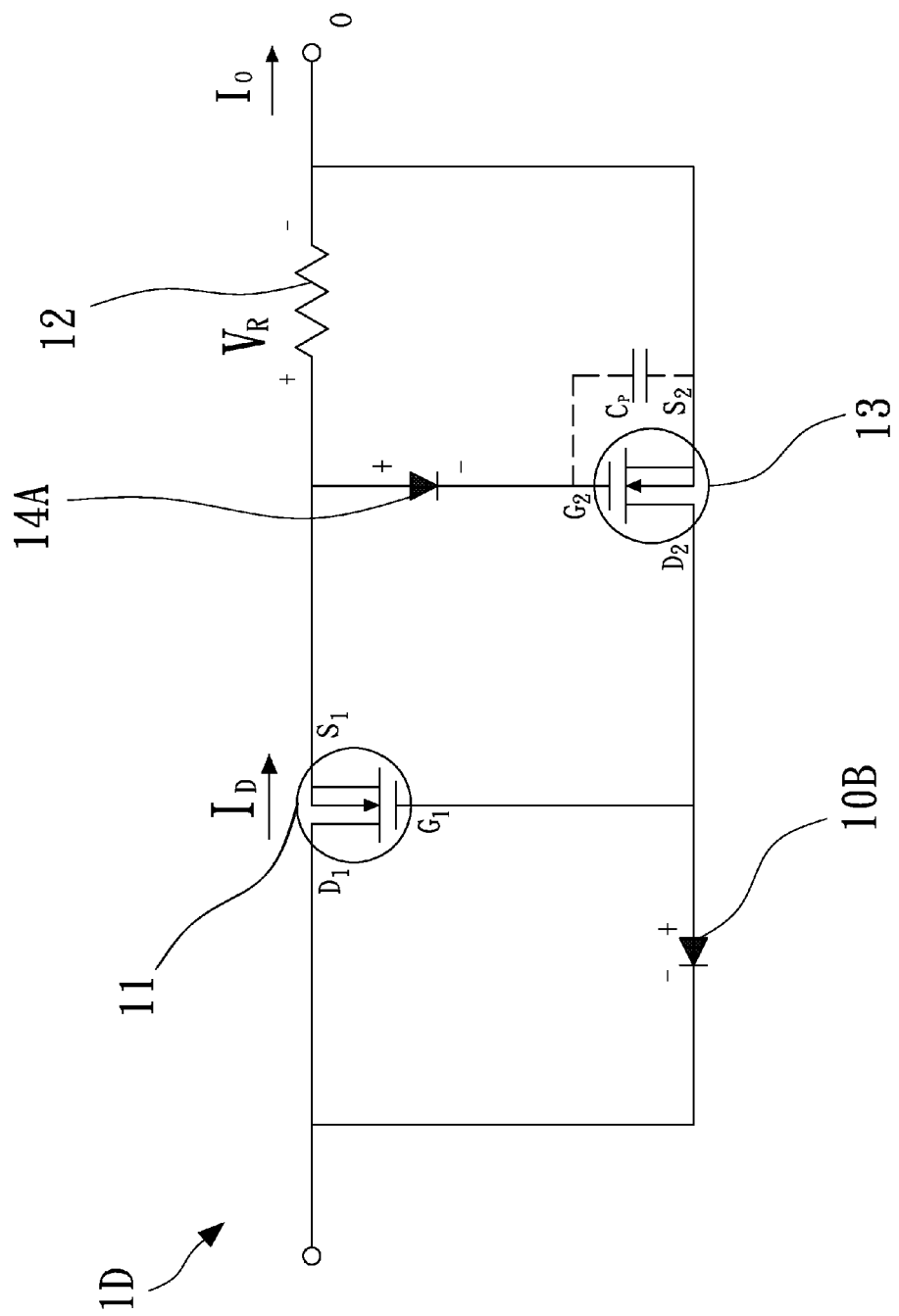
FIG. 6 is a circuit diagram of a fourth embodiment of the limiting current circuit in FIG. 1.
Figure 7:
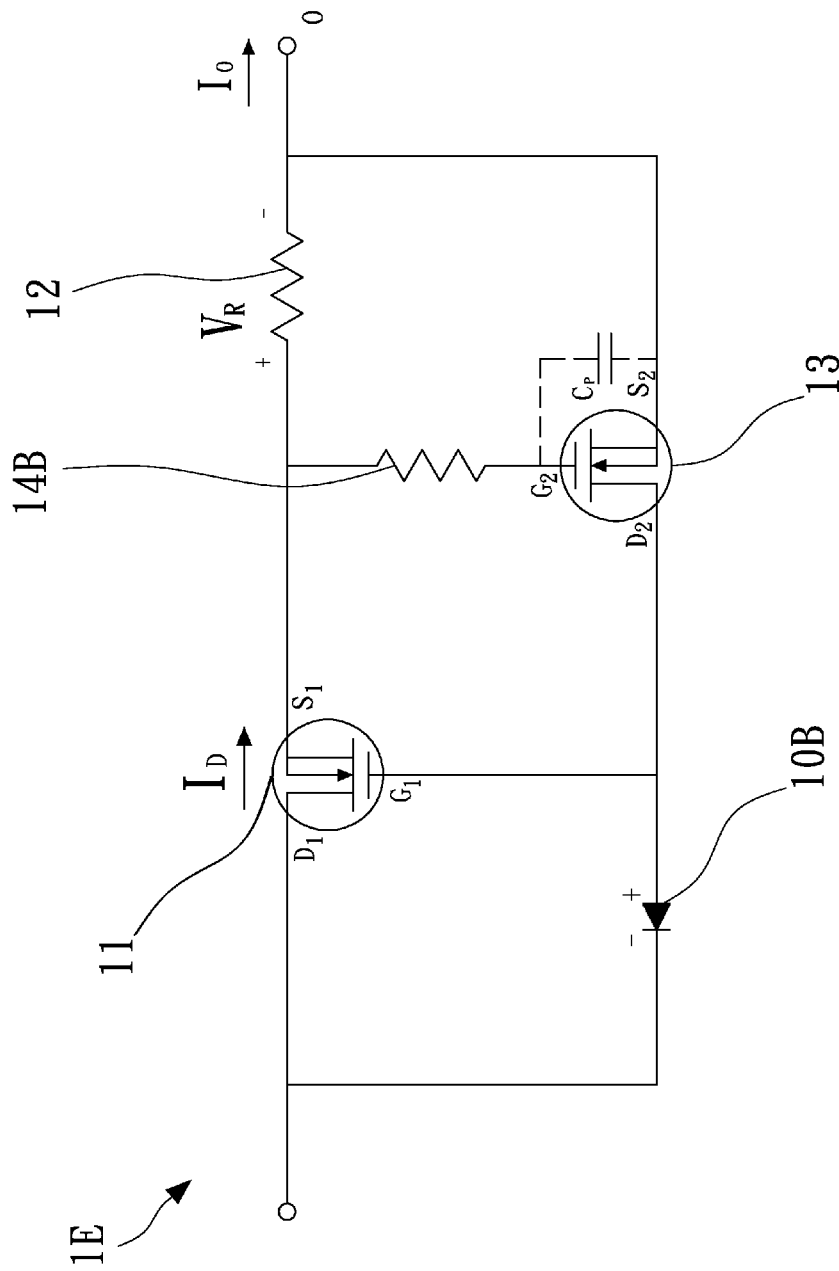
FIG. 7 is a circuit diagram of a fifth embodiment of the limiting current circuit in FIG. 1.
Figure 8:
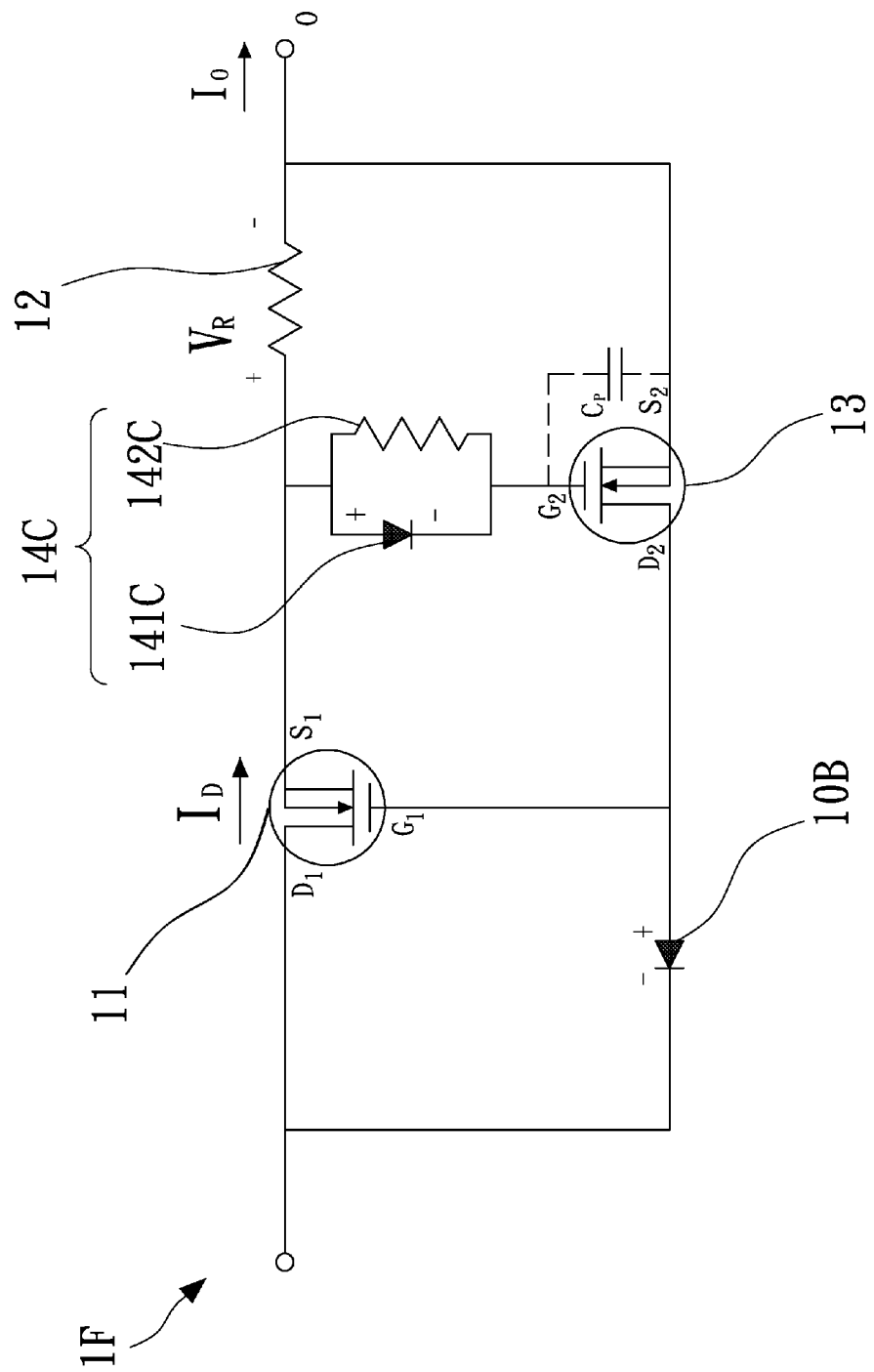
FIG. 8 is a circuit diagram of a sixth embodiment of the limiting current circuit in FIG. 1.
Figure 9:
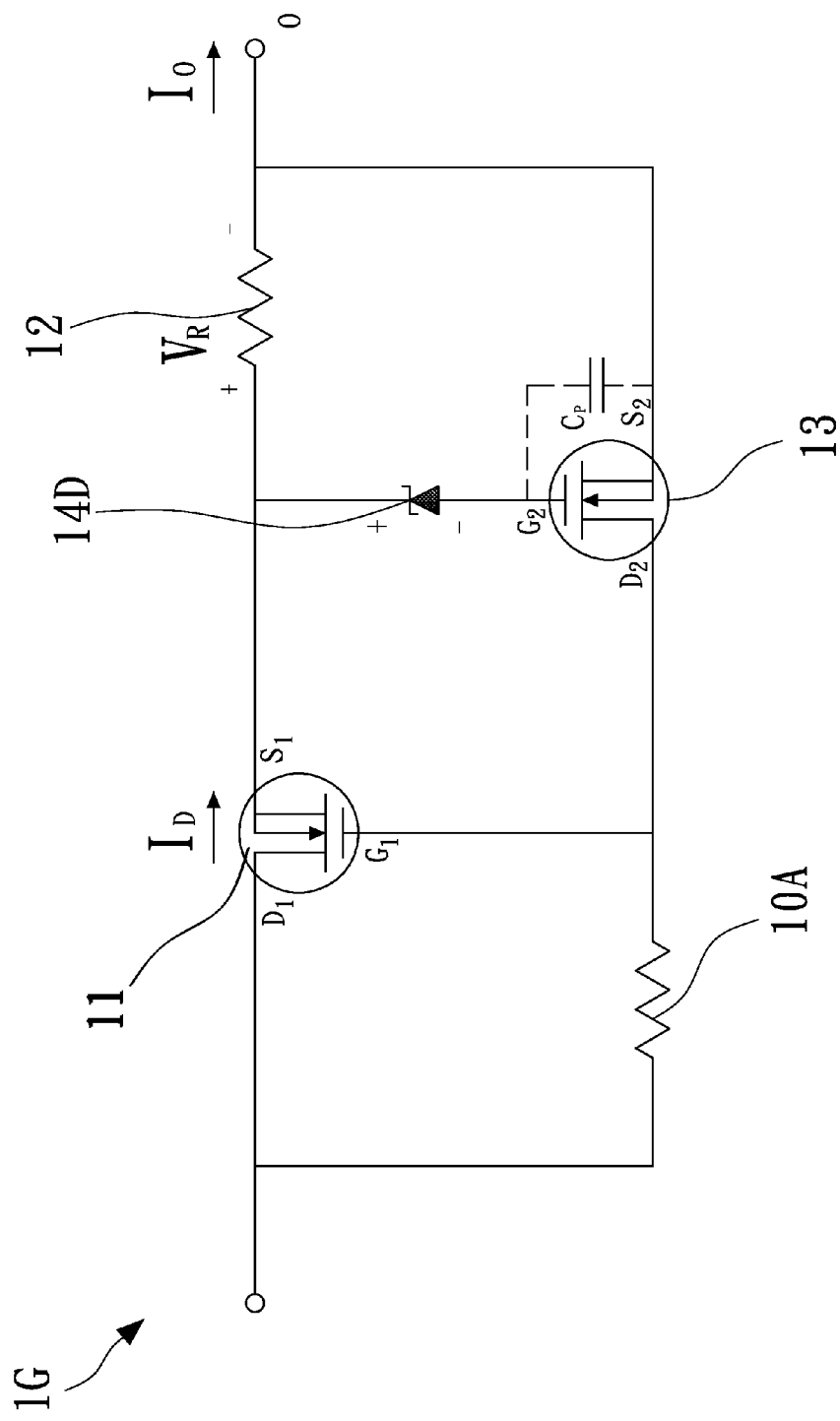
FIG. 9 is a circuit diagram of a seventh embodiment of the limiting current circuit in FIG. 1.
Figure 10:
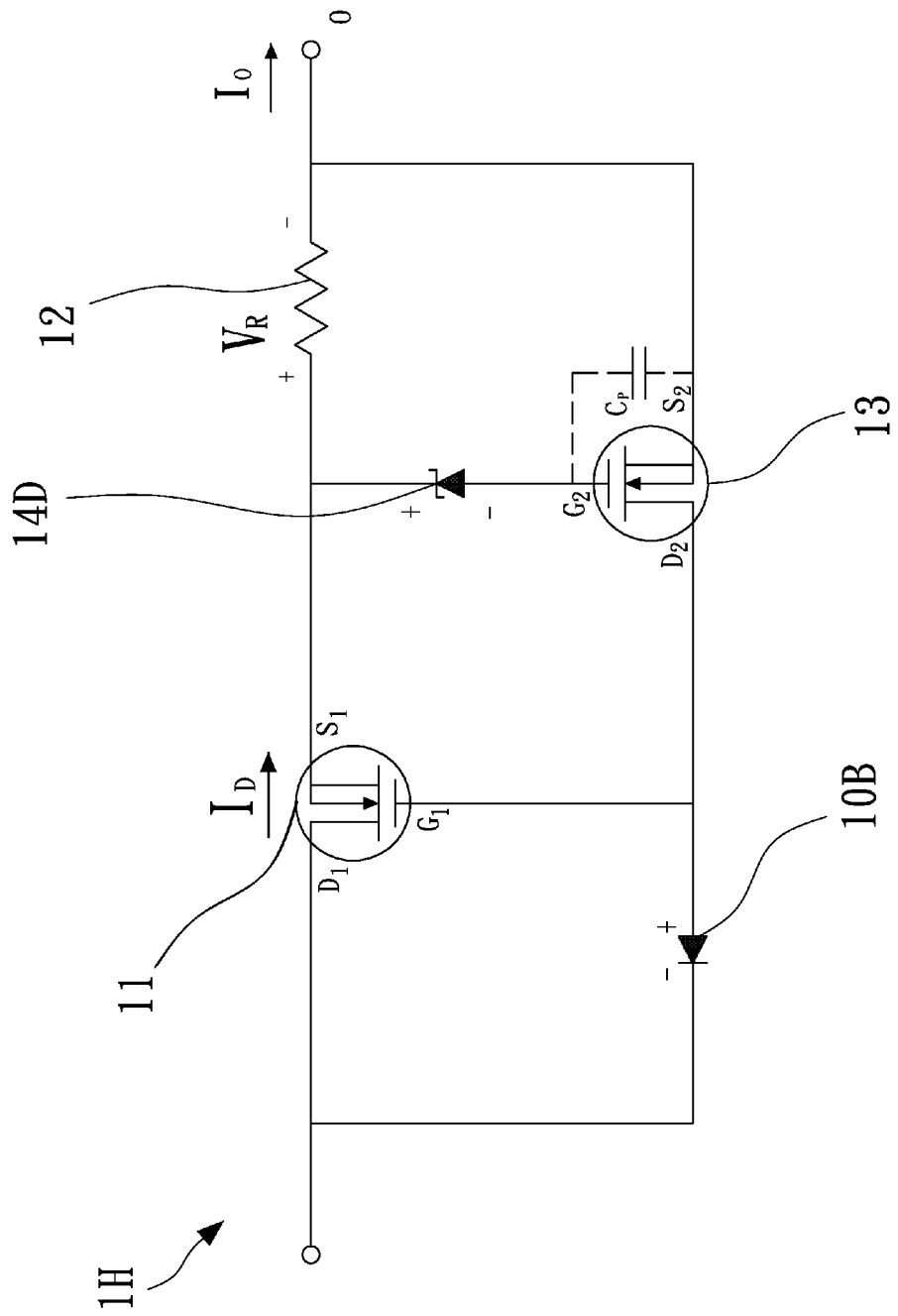
FIG. 10 is a circuit diagram of an eighth embodiment of the limiting current circuit in FIG. 1.

With reference to FIGS. 1 and 2, a limiting current circuit that has output short circuit protection (1) in accordance with the present invention is connected to an external voltage source and comprises an output terminal (O), an input current unit (10), a driving transistor (11), a voltage control resistor (12), a voltage control transistor (13), a delay unit (14) and an optional capacitor (C).

With further reference to FIGS. 3 to 10, the output terminal (O) is connected to a load and has an output current ($I_O$).

The input current unit (10) controls voltage across the input current unit (10) to maintain a constant current, has an input and an output and may be a resistor (10A) or a diode (10B). The input of the input current unit (10) is connected to the external voltage source.

The diode (10B) comprises an anode and a cathode and maintains a constant current by leakage effects of a diode. The anode of the diode (10B) is connected to the gate ($G_1$) of the driving transistor (11). The cathode of the diode (10B) is connected to the external voltage source.

The driving transistor (11) has an internal resistance, a drain current ($I_D$) and a gate voltage ($V_G$), comprises a gate ($G_1$), a drain ($D_1$) and a source ($S_1$) and may be an N-type Metal-Oxide-Semiconductor field-effect transistor. The gate ($G_1$) of the driving transistor (11) is connected to the output of the input current unit (10). The drain ($D_1$) of the driving transistor (11) is connected to the external voltage source.

The voltage control resistor (12) has a resistor voltage ($V_R$) and comprises a first end and a second end. The first end of the voltage control resistor (12) is connected to the source ($S_1$) of the driving transistor (11). The second end of the voltage control resistor (12) is connected to the output terminal (O).

The voltage control transistor (13) comprises a gate ($G_2$), a drain ($D_2$) and a source ($S_2$), has an internal resistance and a parasitic capacitance ($C_P$) and may be an N-type Metal-Oxide-Semiconductor field-effect transistor. The parasitic capacitance ($C_P$) is a capacitance between the gate ($G_2$) and the source ($S_2$) of the voltage control transistor (13).

The drain ($D_2$) is connected to the output of the input current unit (10). The source ($S_2$) is connected to the second end of the voltage control resistor (12) and the output terminal (O).

The delay unit (14) makes the resistor voltage ($V_R$) charging the parasitic capacitance ($C_P$) extend the period of lower internal resistance of the voltage control transistor (13) and the period of higher internal resistance of the driving transistor (11), makes the internal resistance of the voltage control transistor (13) less than the internal resistance of the driving transistor (11) when the load is shorted, comprises a first end and second end and may be a diode (14A), a zener diode (14D), a resistor (14B) or a diode (141C) connected in parallel to a resistor (142C).

The first end of the delay unit (14) is connected to the gate ($G_2$) of the voltage control transistor (13). The second end of the delay unit (14) is connected to the source ($S_2$) of the driving transistor (11).

The diode (14A) comprises an anode and a cathode and has a weak reverse leakage current. The anode of the diode (14A) is connected to the source ($S_1$) of the driving transistor (11). The cathode of the diode (14A) is connected to the gate ($G_2$) of the voltage control transistor (13). Because the reverse leakage current of the diode (14A) is weak, the parasitic capacitance ($C_P$) discharges only through the diode (14A) when the parasitic capacitance ($C_P$) is full.

The zener diode (14D) comprises an anode and a cathode. The anode of the zener diode (14D) is connected to the source ($S_1$) of the driving transistor (11). The cathode of the zener diode (14D) is connected to the gate ($G_2$) of the voltage control transistor (13).

The diode (141C) comprises an anode and a cathode. The anode of the diode (141C) is connected to the source ($S_1$) of the driving transistor (11). The cathode of the diode (141C) is connected to the gate ($G_2$) of the voltage control transistor (13).

The capacitor (C) is mounted between the gate ($G_2$) and the source ($S_2$) of the voltage control transistor (13).

When the load is shorted, the drain current ($I_D$) and the output current ($I_O$) are increased to turn on the driving transistor (11) that it is as a linear resistance and is controlled by the gate voltage ($V_G$). Hence, when the parasitic capacitance ($C_P$) is charging, the internal resistance of the voltage control transistor (13) decreases, the voltage control transistor (13) is turned on and the gate voltage ($V_G$) decreases. Then the driving transistor (11) turns off and the drain current ($I_D$) and the output current ($I_O$) are limited.

Various changes can be made without departing from the broad spirit and scope of the invention.

What is claimed is:

1. A limiting current circuit that has output short circuit protection being connected to an external voltage source and comprising
    an output terminal being connected to a load and has an output current;
    an input current unit controlling voltage across the input current unit to maintain a constant current and having
        an input being connected to the external voltage source; and
        an output;
    a driving transistor having an internal resistance, a drain current and a gate voltage and comprising
        a gate being connected to the output of the input current unit;
        a drain being connected to the external voltage source; and
        a source;
    a voltage control resistor having a resistor voltage and comprising
        a first end being connected to the source of the driving transistor; and
        a second end being connected to the output terminal;
    a voltage control transistor
        comprising
            a gate;
            a drain being connected to the output of the input current unit; and
            a source being connected to the second end of the voltage control resistor and the output terminal; and
        having
            an internal resistance; and
            a parasitic capacitance between the gate and the source of the voltage control transistor; and
    a delay unit making the resistor voltage charging the parasitic capacitance extend the period of lower internal resistance of the voltage control transistor and the period of higher internal resistance of the driving transistor, making the internal resistance of the voltage control transistor less than the internal resistance of the driving transistor when the load being shorted and comprising
        a first end being connected to the gate of the voltage control transistor; and
        a second end being connected to the source of the driving transistor.

2. The limiting current circuit as claimed in claim 1, wherein the delay unit is a diode that comprises
    an anode being connected to the source of the driving transistor; and
    a cathode being connected to the gate of the voltage control transistor.

3. The limiting current circuit as claimed in claim 1, wherein the delay unit is a zener diode that comprises
    an anode being connected to the source of the driving transistor; and
    a cathode being connected to the gate of the voltage control transistor.

4. The limiting current circuit as claimed in claim 1, wherein the delay unit is a resistor.

5. The limiting current circuit as claimed in claim 1, wherein the delay unit is a resistor connected in parallel to a diode that comprises
    an anode being connected to the source of the driving transistor; and
    a cathode being connected to the gate of the voltage control transistor.

6. The limiting current circuit as claimed in claim 1, wherein the input current unit is a resistor.

7. The limiting current circuit as claimed in claim 1, wherein the input current unit is a diode that comprises
    an anode being connected to the gate of the driving transistor; and
    a cathode being connected to the external voltage source.

8. The limiting current circuit as claimed in claim 1 further comprising a capacitor being mounted between the gate and the source of the voltage control transistor.

9. The limiting current circuit as claimed in claim 1, wherein the driving transistor is an N-type Metal-Oxide-Semiconductor field-effect transistor.

10. The limiting current circuit as claimed in claim 1, wherein the voltage control transistor is an N-type Metal-Oxide-Semiconductor field-effect transistor.

* * * * *